No. 61,435.  PATENTED JAN. 22, 1867.
D. KIDDER.
APPARATUS FOR TETHERING ANIMALS.
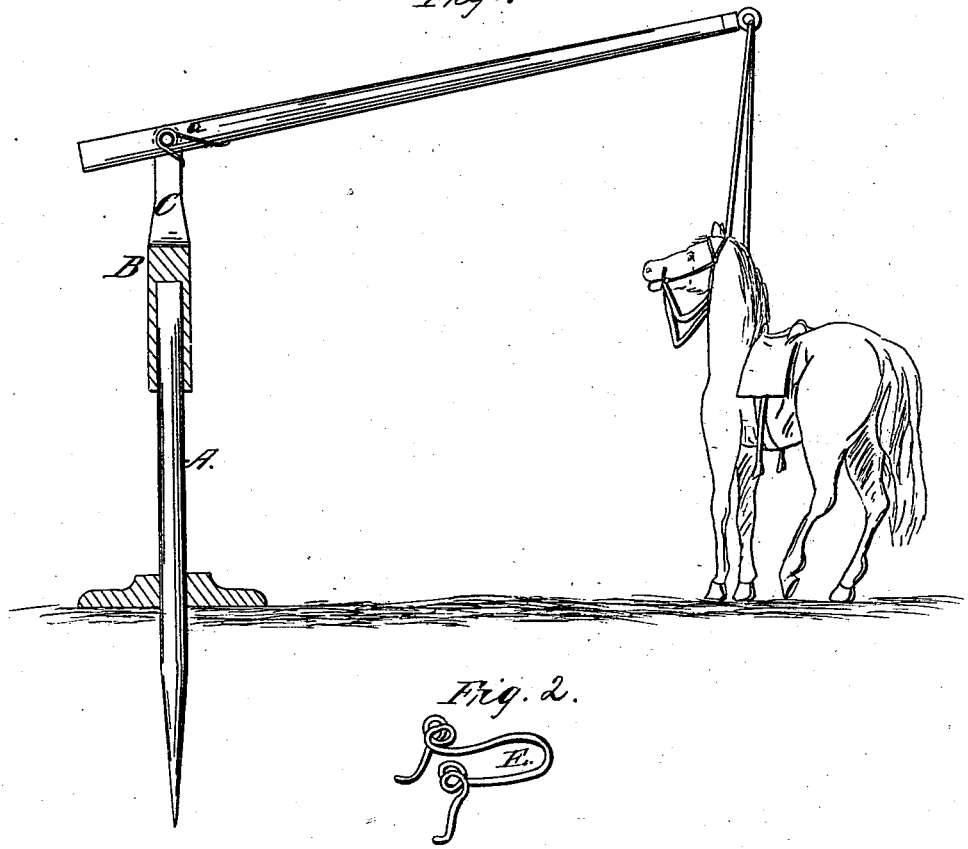
Witnesses
F. A. Jackson
J. A. Service
Inventor:
D. Kidder
Per Munn
Attorney

United States Patent Office.

DANIEL KIDDER, OF FRANKLIN, NEW HAMPSHIRE.

Letters Patent No. 61,435, dated January 22, 1867.

---

IMPROVEMENT IN APPARATUS FOR TETHERING ANIMALS.

---

The Schedule referred to in these Letters Patent and making part of the same.

---

TO ALL WHOM IT MAY CONCERN:

Be it known that I, DANIEL KIDDER, of Franklin, in the county of Merrimac, and State of New Hampshire, have invented a new and improved Tether; and I do hereby declare that the following is a full, clear, and exact description thereof, which will enable those skilled in the art to make and use the same, reference being had to the accompanying drawings, forming part of this specification.

The object sought to be attained by the present invention is to provide a tether, by the use of which it will be impossible for the rope or chain employed, and by which the animal is harnessed or connected with the tether, to become entangled with or about the limbs of such animal.

In the accompanying plate of drawings, my improved tether is illustrated—

Figure 1 being a side elevation of the same; and

Figure 2 a detail view to be hereinafter referred to.

A, in the drawings, represents the stake or upright on which the tether is to be hung. This stake A, at its upper end, is capped by a metallic or other suitable cap, B, terminating in two parallel upright arms C; between which, upon a centre pin $a$, one end of a pole, D, is hung so as to swing up and down in a vertical plane. To the outer end of the pole, D, the horse or other animal is to be harnessed or hitched through a cord, rope, chain, or other suitable line; and to prevent such line from becoming entangled with or about the limbs of the animal while grazing, I have hung a bent spring, E, about the centre pin or pivot, $a$, extending under the said pole, which rests upon it as it is depressed, and thus reacting, tends to throw the pole upward when such pressure is released; the peculiar shape of the spring E being shown in fig. 2 in detail. It may be here remarked, in conclusion, that I do not intend to limit myself to any one particular form or style of spring for the pole, nor to any one material of which it may be made.

I claim as new, and desire to secure by Letters Patent—

The spring E applied to the pole D, in combination with the stake A, substantially as and for the purpose described.

DANIEL KIDDER.

Witnesses:
O. C. BROWN,
N. H. SANBORN.